(12) United States Patent
Nakagawa et al.

(10) Patent No.: US 7,754,388 B2
(45) Date of Patent: Jul. 13, 2010

(54) NONAQUEOUS ELECTROLYTE AND NONAQUEOUS-ELECTROLYTE BATTERY

(75) Inventors: Hiroe Nakagawa, Osaka (JP); Toshiyuki Nukada, Osaka (JP); Yuki Fujimoto, Tokyo (JP)

(73) Assignee: GS Yuasa Corporation, Minami-ku, Kyoto-shi (JP)

( * ) Notice: Subject to any disclaimer, the term of this patent is extended or adjusted under 35 U.S.C. 154(b) by 1447 days.

(21) Appl. No.: 10/536,829

(22) PCT Filed: Nov. 21, 2003

(86) PCT No.: PCT/JP03/14896

§ 371 (c)(1),
(2), (4) Date: May 27, 2005

(87) PCT Pub. No.: WO2004/051784

PCT Pub. Date: Jun. 17, 2004

(65) Prior Publication Data

US 2006/0068296 A1    Mar. 30, 2006

(30) Foreign Application Priority Data

Nov. 29, 2002    (JP) .............................. 2002-346688

(51) Int. Cl.
*H01M 10/05* (2010.01)
*H01M 10/0567* (2010.01)
*H01M 10/0569* (2010.01)

(52) U.S. Cl. ................. 429/324; 429/330; 429/331; 429/337; 429/338

(58) Field of Classification Search ............... None
See application file for complete search history.

(56) References Cited

U.S. PATENT DOCUMENTS 4,304,825 A * 12/1981 Basu .......................... 429/103
4,877,695 A * 10/1989 Cipriano et al. ............. 429/102

(Continued)

FOREIGN PATENT DOCUMENTS

CN         1495957 A        5/2004

(Continued)

OTHER PUBLICATIONS

Official English Translation of JP 3-57168 dated Mar. 14, 1991.*

(Continued)

*Primary Examiner*—Robert Hodge
(74) *Attorney, Agent, or Firm*—McGinn IP Law Group, PLLC (57) ABSTRACT

The object is to provide a nonaqueous-electrolyte battery having high charge/discharge efficiency and excellent high-rate performance. This subject is accomplished by using a nonaqueous electrolyte which comprises an organic solvent and a lithium salt dissolved therein and is characterized by containing at least one quaternary ammonium salt in an amount of 0.06 mol/L or larger and 0.5 mol/L or smaller. This effect is thought to be attributable to the following mechanism: in a relatively early stage (stage in which the negative-electrode potential is relatively noble) in a first charge step, a satisfactory protective coating film is formed on the negative electrode by the action of the quaternary ammonium salt and, hence, the organic solvent employed in the nonaqueous electrolyte is inhibited from decomposing.

14 Claims, 1 Drawing Sheet

U.S. PATENT DOCUMENTS

| | | | |
|---|---|---|---|
| 7,029,793 B2 * | 4/2006 | Nakagawa et al. | ....... 429/231.1 |
| 2004/0053129 A1 | 3/2004 | Jung et al. | |

FOREIGN PATENT DOCUMENTS

| | | |
|---|---|---|
| EP | 1 202 374 A1 | 5/2002 |
| JP | 60-30065 | 2/1985 |
| JP | 3-57168 | 3/1991 |
| JP | 3-59963 | 3/1991 |
| JP | 05-335016 | 12/1993 |
| JP | 6-349523 | 12/1994 |
| JP | 9-139233 | 5/1997 |
| JP | 09-171814 | 6/1997 |
| JP | 2001-143746 | 5/2001 |
| JP | 2001345118 A * | 12/2001 |
| JP | 2002-231305 | 8/2002 |
| JP | 2002-359002 | 12/2002 |
| WO | WO 0186748 A1 * | 11/2001 |

OTHER PUBLICATIONS

Chinese Office Action dated Sep. 8, 2006, with English language translation.

Notification of Reasons for Refusal dated Feb. 15, 2010 with an English translation.

* cited by examiner

CONCENTRATION OF QUATERNARY AMMONIUM SALT
IN NONAQUEOUS ELECTROLYTE, mol/L

NONAQUEOUS ELECTROLYTE AND NONAQUEOUS-ELECTROLYTE BATTERY

TECHNICAL FIELD

The present invention relates to a nonaqueous electrolyte and a nonaqueous-electrolyte battery. More particularly, the invention relates to an improvement in nonaqueous electrolytes.

BACKGROUND ART

Nonaqueous-electrolyte batteries, in particular, lithium secondary batteries, are recently attracting attention as power sources for portable appliances such as portable telephones, PHSs (simplified portable telephones), small computers, etc., power sources for power storage, and power sources for electric motorcars. In general, a lithium secondary battery is constituted of a positive electrode comprising a positive active material as a main component, a negative electrode comprising a negative-electrode material as a main component, and a nonaqueous electrolyte, and is produced by covering a power-generating element comprising the positive and negative electrodes with a sheath. A lithium-containing transition metal oxide and a carbonaceous material are mainly used respectively as the positive active material and negative-electrode material contained in the lithium secondary battery. Of such materials, a graphite is a material suitable for use in batteries having a high energy density because it has flat-potential characteristics. Widely known nonaqueous electrolytes are ones comprising an organic solvent comprising ethylene carbonate as a main component and an electrolyte, e.g., lithium hexafluorophosphate (LiPF$_6$), dissolved in the solvent.

Since the use of ethylene carbonate is apt to cause electrolyte solidification at low temperatures because it has a high melting point, a technique for improving various properties including low-temperature properties is known which comprises using an organic solvent having a high permittivity and a lower melting point (e.g., propylene carbonate). However, especially in the case of using a graphite in the negative electrode, there has been a problem that the organic solvent such as propylene carbonate decomposes on the graphite negative electrode and, hence, charge/discharge cannot be conducted at a high efficiency.

A technique for overcoming that problem has been disclosed which comprises adding vinylene carbonate or the like to a nonaqueous electrolyte to thereby inhibit the organic-solvent decomposition described above (see, for example, patent document 1). Specifically, there is a statement therein to the effect that the vinylene carbonate or the like is selectively decomposed on the graphite negative electrode in the charge conducted first after battery fabrication (this charge is hereinafter referred to as "first charge"), whereby a protective coating film permeable to lithium ions is formed on the surface of the graphite negative electrode and the decomposition of the organic solvent such as propylene carbonate is inhibited. However, this technique was insufficient in the effect of inhibiting the decomposition of the organic solvent during first charge. Furthermore, there has been a problem that vinylene carbonate has poor oxidation resistance and decomposes on the positive-electrode side and, hence, the addition of vinylene carbonate in a large amount reduces battery performances.

On the other hand, quaternary ammonium salts have been frequently used for a long time as an electrolyte material for electric double-layer capacitors. However, with respect to application to batteries, the only technique which has been reported is to use a quaternary ammonium salt in a nonaqueous-electrolyte battery which employs a conductive polymer (polyacene) as an electrode material and in which lithium ions do not participate in the electrode reactions (see patent documents 2 and 3). No advantage has been found in the use thereof in electrolytes for nonaqueous-electrolyte batteries in which lithium ions participate in electrode reactions. On the other hand, some of imidazolium salts and the like which are a kind of quaternary ammonium salt have a property of room temperature molten salts, i.e., being liquid at room temperature. It has hence been proposed to use such a salt as a main component of an electrolyte which eliminates the necessity of using any organic solvent such as those for use in general nonaqueous-electrolyte batteries. (See patent document 4).

[Patent Document 1] JP-A-11-67266
[Patent Document 2] JP-A-62-31958
[Patent Document 3] JP-A-2-177271
[Patent Document 4] JP-A-2002-110230

The invention has been achieved in view of the problems described above. An object of the invention is to provide a nonaqueous-electrolyte battery having a high charge/discharge efficiency and excellent high-rate discharge characteristics.

DISCLOSURE OF THE INVENTION

As a result of intensive investigations, the present inventors have surprisingly found that when a specific nonaqueous electrolyte is used, a nonaqueous-electrolyte battery having a high charge/discharge efficiency and excellent high-rate discharge characteristics is obtained. The invention has been thus achieved. Namely, the technical constitutions of the invention and the effects and advantages thereof are as follows. It is, however, noted that the explanations on the mechanisms of the effects include presumptions and whether these explanations are correct or not does not limit the scope of the invention. The invention may be embodied in other various forms without departing from the spirit or essential characteristics thereof. The embodiments or Examples described above are therefore to be considered in all respects as illustrative and not restrictive. The scope of the invention is indicated by the claims rather than by the description, and all changes and modifications which come within the meaning and range of equivalency of the claims are intended to be embraced therein.

The present inventors made an approach contrary to that used for the related-art techniques described above in which a quaternary ammonium salt is used as a main component. Namely, a system prepared by adding a small amount of a quaternary ammonium salt to a nonaqueous electrolyte comprising an organic solvent and a lithium salt dissolved therein was used, and the influence of the quaternary ammonium salt on the behavior of nonaqueous-electrolyte batteries was closely investigated. As a result, it has been utterly surprisingly found that the quaternary ammonium salt produces a marked effect on the charge/discharge behavior of a nonaqueous-electrolyte battery when the concentration of the salt is in a specific range.

Specifically, it has been found according to the invention that the efficiency of the charge/discharge conducted first after battery fabrication (hereinafter referred to as "initial efficiency") is remarkably improved even in the case where a graphite is used in the negative electrode of the nonaqueous-electrolyte battery or even when the organic solvent of the nonaqueous electrolyte contains propylene carbonate or the like. Furthermore, the nonaqueous-electrolyte battery according to the invention has proved to be remarkably improved also in high-rate discharge characteristics as compared with the batteries according to related-art techniques.

Namely, the nonaqueous electrolyte of the invention contains a lithium salt dissolved therein and is characterized by containing at least one quaternary ammonium salt in an amount of 0.06 mol/L or larger and 0.5 mol/L or smaller. The nonaqueous-electrolyte battery of the invention is obtained by using the nonaqueous electrolyte to fabricate a battery. The mechanism by which such constitutions bring about those marked effects on the nonaqueous-electrolyte battery of the invention has not been fully elucidated. However, it is thought that a protective coating film permeable to lithium ions is formed on the surface of the negative electrode mainly during first charge due to the use of the nonaqueous electrolyte of the invention and, because of this, the organic solvent constituting the nonaqueous electrolyte is surely inhibited from decomposing. Consequently, it is thought that charge/discharge can be conducted at a high efficiency.

Furthermore, the reduction potentials of many quaternary ammonium salts are nobler than the reduction potential of vinylene carbonate. It is therefore thought that in the nonaqueous-electrolyte battery according to the invention, a protective coating film is surely formed in an earlier stage in first charge than in the nonaqueous-electrolyte battery employing vinylene carbonate according to a related-art technique. In addition, the protective coating film formed on the surface of the negative electrode by the decomposition of the quaternary ammonium salt is dense and has excellent permeability to lithium ions. Thus, by merely adding an only slight amount of a quaternary ammonium salt, the organic solvent constituting the nonaqueous electrolyte can be more effectively inhibited from decomposing. Consequently, a nonaqueous-electrolyte battery having a high charge/discharge efficiency and a high energy density can be obtained. Incidentally, since quaternary ammonium salts themselves have substantially no volatility and have high thermal stability because they are salts, the addition thereof does not impair battery safety at all.

Namely, the nonaqueous electrolyte of the invention comprises an organic solvent and a lithium salt dissolved therein, and is characterized by containing at least one quaternary ammonium salt in an amount of 0.06 mol/L or larger and 0.5 mol/L or smaller. Due to this constitution, a nonaqueous electrolyte capable of realizing a battery having a high charge/discharge efficiency and excellent high-rate discharge characteristics can be provided.

The nonaqueous electrolyte of the invention may be characterized in that the quaternary ammonium salt has a structure represented by any of (chemical formula 1), (chemical formula 2), and (chemical formula 3):

(chemical formula 1)

(wherein R1, R2, R3, and R4 each are either an alkyl group having 1-6 carbon atoms or an alkyl group in which at least part of the hydrogen atoms have been replaced by a fluorine atom; and X⁻ is a fluorine-containing anion)

(chemical formula 2)

(wherein R is a divalent organic linking group having a main chain which has 4-5 atoms and is constituted of at least one member selected from carbon, oxygen, nitrogen, sulfur, and phosphorus; R1 and R2 each are either an alkyl group having 1-6 carbon atoms or an alkyl group in which at least part of the hydrogen atoms have been replaced by a fluorine atom; and X⁻ is a fluorine-containing anion)

(chemical formula 3)

(wherein R is an organic linking group or an organic linking group forming an aromatic ring, the organic linking groups each having a main chain which has 4-5 atoms and is constituted of at least one member selected from carbon, oxygen, nitrogen, sulfur, and phosphorus and having one single-bond end and one double-bond end; R1 is an alkyl group having 1-6 carbon atoms or an alkyl group in which at least part of the hydrogen atoms have been replaced by a fluorine atom; and X⁻ is a fluorine-containing anion).

Due to this constitution, a nonaqueous electrolyte can be provided which enables a lithium ion-permeable protective coating film which is denser and has higher permeability to lithium ions to be formed during first charge on the surface of the negative electrode of the battery employing the electrolyte to thereby effectively inhibit the decomposition of the organic solvent constituting the nonaqueous electrolyte, and which enables the battery to be sufficiently charged/discharged in the second and subsequent cycles and thereby have an improved charge/discharge efficiency.

Furthermore, the nonaqueous electrolyte of the invention may be characterized by containing one or more organic solvents selected from the group consisting of ethylene carbonate, propylene carbonate, butylene carbonate, γ-butyrolactone, and γ-valerolactone.

Due to this constitution, the battery employing this nonaqueous electrolyte can have a remarkably improved initial efficiency although such organic solvent is used. Consequently, a nonaqueous electrolyte for nonaqueous-electrolyte batteries can be provided which sufficiently takes advantage of properties of those solvents, i.e., the properties of having a high boiling point and a high flash point and having a high permittivity and excellent oxidation resistance.

Moreover, the nonaqueous electrolyte of the invention may be characterized in that the anion species contained in the nonaqueous electrolyte is one or more members selected from the group consisting of $BF_4^-$, $PF_6^-$, $CF_3SO_3^-$, $N(CF_3SO_2)_2^-$, $N(C_2F_5SO_2)_2^-$, $N(CF_3SO_2)(C_4F_9SO_2)^-$; $C(CF_3SO_2)_3^-$, and $C(C_2F_5SO_2)_3^-$.

In this constitution, the anion species of the lithium salt or quaternary ammonium salt is one containing fluorine atoms.

The salt hence readily dissolves in the nonaqueous electrolyte. Consequently, the effects described above are effectively obtained. In particular, by selecting the anion species from the group shown above, a nonaqueous-electrolyte battery combining high performances and excellent safety can be obtained because those fluorine-containing anions are stable over a wide potential range. Those anion species may be contained alone, or two or more thereof may be simultaneously contained.

The nonaqueous-electrolyte battery of the invention comprises a positive electrode, a negative electrode, and a nonaqueous electrolyte, and is characterized by having been fabricated using the nonaqueous electrolyte described above. Due to this constitution, a nonaqueous-electrolyte battery can be provided in which the effects of the invention described above are produced.

Furthermore, the nonaqueous-electrolyte battery of the invention may be characterized in that the negative electrode employs a graphite. Due to this constitution, although a graphite is used as a negative-electrode material, first charge can be conducted while effectively inhibiting the decomposition of the organic solvent constituting the nonaqueous electrolyte. This constitution further brings about an improvement in high-rate discharge characteristics. Consequently, by using a graphite in the negative electrode, a nonaqueous-electrolyte battery can be provided which sufficiently takes advantage of that property of a graphite negative electrode material which is the property of showing a flat potential change to enable a high energy density.

Moreover, the nonaqueous-electrolyte battery of the invention may be characterized by having a sheath comprising a metal/resin composite material. In this constitution, even though the sheath is made of a flexible material, there is no possibility that the battery might swell during charge because the nonaqueous electrolyte in the battery system of the invention can be effectively inhibited from decomposing during charge due to the functions described above and, hence, almost no gas generation occurs during charge. Consequently, a sheath comprising a lightweight metal/resin composite material can be employed and a nonaqueous-electrolyte battery having a further improved energy density can hence be provided.

It is thought that in the nonaqueous-electrolyte battery according to the invention, part of the quaternary ammonium salt is consumed by the reaction for forming a protective coating film in a first charge step. There are hence cases where the concentration of the quaternary ammonium salt in the nonaqueous electrolyte present in the nonaqueous-electrolyte battery according to the invention after the first charge step is lower than the concentration of the quaternary ammonium salt in the nonaqueous electrolyte of the invention used in the battery.

Embodiments of the invention will be shown below, but the invention should not be construed as being limited by the following statements.

The quaternary ammonium salt to be used in the invention more preferably has a structure represented by any of (chemical formula 1), (chemical formula 2), and (chemical formula 3). Examples of the quaternary ammonium salt represented by (chemical formula 1) include quaternary ammonium salts such as $(CH_3)_4NBF_4$, $(CH_3)_4NBr$, $(CH_3)_4N(CF_3SO_2)_2N$, $(CH_3)_4N(C_2F_5SO_2)_2N$, $(C_2H_5)_4NBF_4$, $(C_2H_5)_4NClO_4$, $(C_2H_5)_4NI$, $(C_2H_5)_4N(CF_3SO_2)_2N$, $(C_2H_5)_4N(C_2F_5SO_2)_2N$, $(C_3H_7)_4NBr$, $(n-C_4H_9)_4NBF_4$, $(n-C_4H_9)_4N(CF_3SO_2)_2N$, $(n-C_4H_9)_4N(C_2F_5SO_2)_2N$, $(n-C_4H_9)_4NClO_4$, $(n-C_4H_9)_4NI$, $(C_2H_5)_4N$-maleate, $(C_2H_5)_4N$-benzoate, and $(C_2H_5)_4N$-phtalate. However, the quaternary ammonium salt represented by (chemical formula 1) should not be construed as being limited to these.

Examples of the quaternary ammonium salt represented by (chemical formula 2) include quaternary ammonium salts comprising a combination of a pyrrolidinium cation, piperidinium cation, pyrrolium cation, or the like and an anion. However, quaternary ammonium salt represented by (chemical formula 2) should not be construed as being limited to these.

Examples of the pyrrolidinium cation include a 1,1-dimethylpyrrolidinium ion, 1-ethyl-1-methylpyrrolidinium ion, 1-methyl-1-propylpyrrolidinium ion, and 1-butyl-1-methylpyrrolidinium ion. However, the pyrrolidinium cation should not be construed as being limited to these.

Examples of the piperidinium cation include a 1,1-dimethylpiperidinium ion, 1-ethyl-1-methylpiperidinium ion, 1-methyl-1-propylpiperidinium ion, and 1-butyl-1-methylpiperidinium ion. However, the piperidinium cation should not be construed as being limited to these. Examples of the pyrrolium cation include a 1,1-dimethylpyrrolium ion, 1-ethyl-1-methylpyrrolium ion, 1-methyl-1-propylpyrrolium ion, and 1-butyl-1-methylpyrrolium ion. However, the pyrrolium cation should not be construed as being limited to these.

Examples of the quaternary ammonium salt represented by (chemical formula 3) include quaternary ammonium salts comprising a combination of an imidazolium cation, pyrazolium cation, pyrrolinium cation, pyridinium cation, or the like and an anion. However, the quaternary ammonium salt represented by (chemical formula 3) should not be construed as being limited to these.

Examples of the imidazolium cation include a 1,3-dimethylimidazolium ion, 1-ethyl-3-methylimidazolium ion, 1-butyl-3-methylimidazolium ion, 1,2,3-trimethylimidazolium ion, 1,2-dimethyl-3-ethylimidazolium ion, 1,2-dimethyl-3-propylimidazolium ion, and 1-butyl-2,3-dimethylimidazolium ion. However, the imidazolium cation should not be construed as being limited to these. Examples of the pyrazolium cation include a 1,2-dimethylpyrazolium ion, 1-ethyl-2-methylpyrazolium ion, 1-propyl-2-methylpyrazolium ion, and 1-butyl-2-methylpyrazolium ion. However, the pyrazolium cation should not be construed as being limited to these. Examples of the pyrrolinium cation include a 1,2-dimethylpyrrolinium ion, 1-ethyl-2-methylpyrrolinium ion, 1-propyl-2-methylpyrrolinium ion, and 1-butyl-2-methylpyrrolinium ion. However, the pyrrolinium cation should not be construed as being limited to these. Examples of the pyridinium cation include an N-methylpyridinium ion, N-ethylpyridinium ion, N-propylpyridinium ion, N-butylpyridinium ion, 1-ethyl-2-methylpyridinium, 1-butyl-4-methylpyridinium, and 1-butyl-2,4-dimethylpyridinium. However, the pyridinium cation should not be construed as being limited to these.

Examples of the anions include a chlorine anion, bromine anion, $ClO_4$ anion, $BF_4$ anion, $PF_6$ anion, $CF_3SO_3$ anion, $N(CF_3SO_2)_2$ anion, $N(C_2F_5SO_2)_2$ anion, $N(CF_3SO_2)(C_4F_9SO_2)$ anion, $C(CF_3SO_2)_3$ anion, and $C(C_2F_5SO_2)_3$ anion. However, the anions should not be construed as being limited to these.

Those quaternary ammonium salts can be used alone or as a mixture of two or more thereof.

The amount of the quaternary ammonium salt to be incorporated in the nonaqueous electrolyte of the invention is 0.06 mol/L or larger and 0.5 mol/L or smaller based on the whole amount of the nonaqueous electrolyte. Preferably, the amount thereof is 0.1-0.35 mol/L. In case where the amount of the quaternary ammonium salt contained is smaller than 0.06 mol/L based on the whole amount of the nonaqueous electrolyte, the organic solvent constituting the nonaqueous electrolyte cannot be sufficiently inhibited from decomposing during first charge, making it difficult to sufficiently charge the battery. On the other hand, in case where the amount of the quaternary ammonium salt contained exceeds 0.5 mol/L, it is impossible to sufficiently heighten the charge efficiency and high-rate discharge characteristics. The reasons for this may be because the nonaqueous electrolyte comes to have an increased viscosity and the protective coating film comes to have increased resistance, although presumptions are included.

As the organic solvent constituting the nonaqueous electrolyte can be used an organic solvent generally used in nonaqueous electrolytes for nonaqueous-electrolyte batteries. Examples thereof include cyclic carbonates such as propylene carbonate, ethylene carbonate, butylene carbonate, chloroethylene carbonate, vinylene carbonate, and vinylethylene carbonate; cyclic esters such as γ-butyrolactone, γ-valerolactone, and propiolactone; chain carbonates such as dimethyl carbonate, diethyl carbonate, ethyl methyl carbonate, and diphenyl carbonate; chain esters such as methyl acetate and methyl lactate; ethers such as tetrahydrofuran or derivatives thereof, 1,3-dioxane, dimethoxyethane, diethoxyethane, methoxyethoxyethane, and methyldiglyme; nitriles such as acetonitrile and benzonitrile; dioxolane or derivatives thereof; and sulfolane, sultones, or derivatives thereof. These may be used alone or as a mixture or the like of two or more thereof. The organic solvent should not be construed as being limited to these examples.

It is especially preferred in the invention that the nonaqueous electrolyte should contain at least one member selected from ethylene carbonate, propylene carbonate, butylene carbonate, γ-butyrolactone, and γ-valerolactone, because this nonaqueous electrolyte can sufficiently produce the effects of the invention.

Examples of the electrolyte salt include inorganic ionic salts containing one of lithium (Li), sodium (Na), and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN; and organic ionic salts such as $LiCF_3SO_3$, $LiN(CF_3SO_2)_2$, $LiN(C_2F_5SO_2)_2$, $LiN(CF_3SO_2)$ $(C_4F_9SO_2)$, $LiC(CF_3SO_2)_3$, $LiC(C_2F_5SO_2)_3$, lithium stearylsulfonate, lithium octylsulfonate, and lithium dodecylbenzenesulfonate. These ionic compounds can be used alone or as a mixture of two or more thereof.

It is especially preferred in the invention that one or more lithium salts selected from $LiBF_4$, $LiPF_6$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$ be contained as the electrolyte salt(s). In particular, use of a mixture of one or more salts selected from the group consisting of $LiPF_6$ and $LiBF_4$ with one or more salts selected from the group consisting of lithium salts having one or more perfluoroalkyl groups, such as $LiN(CF_3SO_2)_2$ and $LiN(C_2F_5SO_2)_2$, is preferred because this mixture has the effect of improving the storability of the nonaqueous-electrolyte battery.

The concentration of the electrolyte salt in the nonaqueous electrolyte is preferably from 0.1 mol/L to 5 mol/L, more preferably from 1 mol/L to 2.5 mol/L, from the standpoint of surely obtaining a nonaqueous-electrolyte battery having high battery characteristics. The mixing ratio between the electrolyte salt and the quaternary ammonium salt is such that the electrolyte salt/quaternary ammonium salt ratio by mole is preferably 50/50 or higher, more preferably 70/30 or higher.

The positive active material to be used as a main component of the positive electrode desirably is any one of or a mixture of two or more of lithium-containing transition metal oxides, lithium-containing phosphoric acid salts, lithium-containing sulfuric acid salts, and the like. Examples of the lithium-containing transition metal oxides include Li—Co composite oxides and Li—Mn composite oxides. Such oxides in which part of the cobalt or manganese has been replaced by one or more metals in Groups I to VIII of the periodic table (preferably one or more elements selected from the group consisting of, e.g., Li, Ca, Cr, Ni, Mn, Fe, and Co) can also be advantageously used. Examples of the Li—Mn composite oxides include one having a spinel crystal structure and one having an α-$NaFeO_2$ type crystal structure, and either of these can be advantageously used. According to battery designs, a suitable one can be selected from these lithium-containing transition metal oxides or a mixture thereof may be used.

A mixture of any of those lithium-containing compounds with another positive active material may be used. Examples of the positive active material usable besides the lithium-containing compounds include compounds of a Group I metal, such as CuO, $Cu_2O$, $Ag_2O$, CuS, and $CuSO_4$, compounds of a Group IV metal, such as $TiS_2$, $SiO_2$, and SnO, compounds of a Group V metal, such as $V_2O_5$, $V_6O_{12}$, $VO_x$, $Nb_2O_5$, $Bi_2O_3$, and $Sb_2O_3$, compounds of a Group VI metal, such as $CrO_3$, $Cr_2O_3$, $MoO_3$, $MoS_2$, $WO_3$, and $SeO_2$, compounds of a Group VII metal, such as $MnO_2$ and $Mn_2O_3$, compounds of a Group VIII metal, such as $Fe_2O_3$, FeO, $Fe_3O_4$, $Ni_2O_3$, NiO, $CoO_3$, and CoO, and metal compounds represented by the general formula $Li_xMX_2$ or $Li_xMN_yX_2$ (wherein M and N each represent a metal in Groups I to VIII, and X represents a chalcogen atom such as oxygen or sulfur) such as, e.g., lithium-cobalt composite oxides and lithium-manganese composite oxides. Examples thereof further include conductive polymeric compounds, such as disulfides, polypyrrole, polyaniline, poly-p-phenylene, polyacetylene, and polyacene materials, and carbonaceous materials of the pseudo-graphite structure. However, usable positive active materials should not be construed as being limited to these examples.

Examples of the negative-electrode material to be used as a main component of the negative electrode include carbonaceous materials, metal oxides such as tin oxides and silicon oxides, and materials obtained by modifying these materials by adding phosphorus or boron for the purpose of improving negative-electrode properties. Of carbonaceous materials, graphites have an operating potential very close to that of metallic lithium and are hence effective in diminishing self-discharge when a lithium salt is employed as an electrolyte. Furthermore, graphites are effective in reducing the irreversible capacity in charge/discharge. Consequently, graphites are preferred negative-electrode materials. In addition, since the nonaqueous electrolyte containing a quaternary ammonium salt is used in the invention, the organic solvent constituting the nonaqueous electrolyte can be surely inhibited from decomposing on the negative electrode comprising a graphite as a main component during charge. The advantageous properties of the graphite shown above can hence be surely exhibited.

Results of examinations by X-ray diffractometry, etc. of graphites which can be advantageously used are shown below.

Lattice spacing ($d_{002}$): 0.333-0.350 nm
Crystallite size in a-axis direction, La: ≧90 nm
Crystallite size in c-axis direction, Lc: ≧20 nm
True density: 2.00-2.25 g/$cm^3$ It is also possible to modify a graphite by adding thereto a metal oxide, e.g., tin oxide or silicon oxide, phosphorus, boron, amorphous carbon, or the like. In particular, modifying the surface of a graphite by the method described above is desirable because this modification can inhibit electrolyte decomposition and thereby heighten battery characteristics. Furthermore, a combination of a graphite and either lithium metal or a lithium metal-containing alloy, such as lithium-aluminum, lithium-lead, lithium-tin, lithium-aluminum-tin, lithium-gallium, or Wood's metal, or the like can be used as a negative-electrode material. A graphite into which lithium has been inserted beforehand by electrochemical reduction can also be used as a negative-electrode material.

Furthermore, at least a surface layer part of a powder of the positive active material and a powder of the negative-electrode material may be modified with a substance having satisfactory electron conductivity or ion conductivity or with a compound having a hydrophobic group. Examples of this modification include the deposition of a substance having satisfactory electron conductivity, such as gold, silver, carbon, nickel, or copper, a substance having satisfactory ion conductivity, such as lithium carbonate, a boron-containing glass, or a solid electrolyte, or a substance having a hydrophobic group, such as a silicone oil, by a technique such as plating, sintering, mechanofusion, vapor deposition, baking, etc.

A powder of the positive active material and a powder of the negative-electrode material desirably have an average particle size of 100 µm or smaller. In particular, it is desirable that the average particle size of the powder of the positive active material be 10 m or smaller for the purpose of improving the high-output characteristics of the nonaqueous-electrolyte battery. A pulverizer and a classifier are used for obtaining a powder having a given size. For example, use is made of a mortar, ball mill, sand mill, oscillating ball mill, planetary ball mill, jet mill, counter jet mill, or cyclone type jet mill and sieves or the like. Pulverization may be conducted by wet pulverization in which water or an organic solvent, e.g., hexane, coexists. Methods of classification are not particularly limited, and sieves, an air classifier, or the like is used in each of dry and wet processes according to need.

Although the positive active material and the negative-electrode material were described above in detail, the positive electrode and negative electrode may contain a conductive material, a binder, and a filler as other components besides the active materials as main components.

The conductive material is not limited as long as it is an electron-conductive material not adversely influencing battery performances. Usually, however, conductive materials such as natural graphite (e.g., flake graphite, flaky graphite, or soil-like graphite), artificial graphite, carbon black, acetylene black, Ketjen Black, carbon whiskers, carbon fibers, metal (e.g., copper, nickel, aluminum, silver, or gold) powders, metal fibers, and conductive ceramic materials can be incorporated alone or as a mixture thereof.

A preferred conductive material of these is acetylene black from the standpoints of conductivity and applicability. The amount of the conductive material to be added is preferably from 1% by weight to 50% by weight, especially preferably from 2% by weight to 30% by weight, based on the total weight of the positive electrode or negative electrode. For mixing those ingredients, physical mixing is conducted. Homogeneous mixing is ideal. For this mixing, a powder mixer such as a V-type mixer, S-type mixer, mortar mill, ball mill, or planetary mill can be used in a dry or wet mixing process.

As the binder can usually be used one of or a mixture of two or more of thermoplastic resins such as polytetrafluoroethylene, poly(vinylidene fluoride), polyethylene, and polypropylene, polymers having rubber elasticity, such as ethylene/propylene/diene terpolymers (EPDM), sulfonated EPDM, styrene/butadiene rubbers (SBR), and fluororubbers, polysaccharides such as carboxymethyl cellulose, and the like. In the case of a binder having functional groups reactive with lithium, such as polysaccharides, it is desirable to deactivate the functional groups beforehand by, e.g., methylation. The amount of the binder to be added is preferably 1-50% by weight, especially preferably 2-30% by weight, based on the total weight of the positive electrode or negative electrode.

As the filler may be used any material which does not adversely influence battery performances. Usually, use is made of an olefin polymer such as polypropylene or polyethylene, a metal oxide such as silicon oxide, titanium oxide, aluminum oxide, magnesium oxide, zirconium oxide, zinc oxide, or iron oxide, a metal carbonate such as calcium carbonate or magnesium carbonate, a glass, carbon, etc. The amount of the filler to be added is preferably up to 30% by weight based on the total weight of the positive electrode or negative electrode.

The positive electrode and negative electrode are produced preferably by mixing the active material, a conductive material, and a binder with an organic solvent, e.g., N-methylpyrrolidone or toluene, subsequently applying the resultant liquid mixture to the current collector which will be described below, and then drying the coating. In the application, it is desirable to apply the liquid mixture, for example, by roller coating using an applicator roll, screen coating, doctor blade coating, spin coating, or coating with a bar coater or the like in any desired thickness and any desired shape. However, methods of application should not be construed as being limited to these.

As the current collector may be used any electron conductor which does not exert an adverse influence in the battery fabricated. For example, the current collector for the positive electrode can be aluminum, titanium, stainless steel, nickel, burned carbon, a conductive polymer, conductive glass, or the like. Besides these, use can be made, as the positive-electrode current collector, of a material obtained by treating the surface of aluminum, copper, or the like with carbon, nickel, titanium, silver, or the like for the purpose of improving adhesiveness, conductivity, and reduction resistance. The current collector for the negative electrode can be copper, nickel, iron, stainless steel, titanium, aluminum, burned carbon, a conductive polymer, conductive glass, Al—Cd alloy, or the like. Besides these, use can be made, as the negative-electrode current collector, of a material obtained by treating the surface of copper or the like with carbon, nickel, titanium, silver, or the like for the purpose of improving adhesiveness, conductivity, and oxidation resistance. These materials can be subjected to a surface oxidation treatment.

With respect to the shape of the current collector, use is made of a foil form or a film, sheet, net, punched or expanded, lath, porous, or foamed form. A structure made up of fibers is also usable. Although the thickness thereof is not particularly limited, collectors having a thickness of 1-500 µm are used. Of these current collectors, a preferred collector for the positive electrode is an aluminum foil, which has excellent oxidation resistance. Preferred current collectors for the negative electrode are a copper foil, nickel foil, and iron foil, which are stable in a reducing field, have excellent electrical conductivity, and are inexpensive, and an alloy foil containing part of these. Furthermore, these foils preferably are ones in which the rough-surface side has a surface roughness Ra of 0.2 µm or more. This surface roughness enables the current collector to retain excellent adhesion to the positive active material or negative-electrode material. It is therefore preferred to use an electrolytic foil, which has such a rough surface. Most preferred is an electrolytic foil which has undergone a "hana" surface treatment.

The separator for nonaqueous-electrolyte batteries preferably is one of or a combination of two or more of microporous films, nonwoven fabrics, and the like which show excellent rate characteristics. Examples of the material constituting the separator for nonaqueous-electrolyte batteries include polyolefin resins represented by polyethylene and polypropylene, polyester resins represented by poly(ethylene terephthalate) and poly(butylene terephthalate), poly(vinylidene fluoride), vinylidene fluoride/hexafluoropropylene copolymers, vinylidene fluoride/perfluorovinyl ether copolymers, vinylidene fluoride/tetrafluoroethylene copolymers, vinylidene fluoride/trifluoroethylene copolymers, vinylidene fluoride/fluoroethylene copolymers, vinylidene fluoride/hexafluoroacetone copolymers, vinylidene fluoride/ethylene copolymers, vinylidene fluoride/propylene copolymers, vinylidene fluoride/trifluoropropylene copolymers, vinylidene fluoride/tetrafluoroethylene/-hexafluoropropylene copolymers, and vinylidene fluoride/ethylene/tetrafluoroethylene copolymers.

The porosity of the separator for nonaqueous-electrolyte batteries is preferably 98% by volume or lower from the standpoint of strength. The porosity thereof is preferably 20% by volume or higher from the standpoint of charge/discharge characteristics.

As the separator for nonaqueous-electrolyte batteries may be used a polymer gel constituted of a polymer of, e.g., acrylonitrile, ethylene oxide, propylene oxide, methyl methacrylate, vinyl acetate, vinylpyrrolidone, vinylidene fluoride, or the like and an electrolyte.

Furthermore, a separator for nonaqueous-electrolyte batteries which comprises a combination of a porous film, nonwoven fabric, or the like such as that described above and a polymer gel is desirable because use of this separator improves electrolyte retention. Namely, the surface of a microporous polyethylene film and the walls of the micropores are coated in a thickness of up to several micrometers with a polymer having affinity for solvents and an electrolyte is held in the micropores of the coated film, whereby the polymer having affinity for solvents gels.

Examples of the polymer having affinity for solvents include poly(vinylidene fluoride) and polymers formed by the crosslinking of an acrylate monomer having an ethylene oxide group or ester group, epoxy monomer, monomer having isocyanate groups, or the like. Heat, actinic rays such as ultraviolet (UV) or electron beams (EB), or the like can be used for the crosslinking.

For the purpose of regulating strength or properties, a property regulator can be incorporated into the polymer having affinity for solvents in such an amount as not to inhibit the formation of a crosslinked structure. Examples of the property regulator include inorganic fillers {metal oxides such as silicon oxide, titanium oxide, aluminum oxide, magnesium oxide, zirconium oxide, zinc oxide, and iron oxide and metal carbonates such as calcium carbonate and magnesium carbonate} and polymers {poly(vinylidene fluoride), vinylidene fluoride/hexafluoropropylene copolymers, polyacrylonitrile, poly(methyl methacrylate), and the like}. The amount of the property regulator to be added is generally up to 50% by weight, preferably up to 20% by weight, based on the crosslinkable monomer.

Examples of the acrylate monomer include unsaturated monomers having a functionality of 2 or higher. Specific examples thereof include difunctional (meth)acrylates {ethylene glycol di(meth)acrylate, propylene glycol di(meth) acrylate, adipic acid dineopentyl glycol ester di(meth)acrylate, polyethylene glycol di(meth)acrylates having a degree of polymerization of 2 or higher, polypropylene glycol di(meth)acrylates having a degree of polymerization of 2 or higher, polyoxyethylene/polyoxypropylene copolymer di(meth)acrylates, butanediol di(meth)acrylate, hexamethylene glycol di(meth)acrylate, and the like}, trifunctional (meth)acrylates {trimethylolpropane tri(meth)acrylate, glycerol tri(meth)acrylate, tri(meth)acrylates of ethylene oxide adducts of glycerol, tri(meth)acrylates of propylene oxide adducts of glycerol, tri(meth)acrylates of ethylene oxide/propylene oxide adducts of glycerol, and the like}, and (meth) acrylates having a functionality of 4 or higher {pentaerythritol tetra(meth)acrylate, diglycerol hexa(meth)acrylate, and the like}. These monomers can be used alone or in combination.

A monofunctional monomer may be added to the acrylate monomer for the purpose of property regulation, etc. Examples of the monofunctional monomer include unsaturated carboxylic acids {acrylic acid, methacrylic acid, crotonic acid, cinnamic acid, vinylbenzoic acid, maleic acid, fumaric acid, itaconic acid, citraconic acid, mesaconic acid, methylmalonic acid, aconitic acid, and the like}; unsaturated sulfonic acids {styrenesulfonic acid, acrylamido-2-methylpropanesulfonic acid, and the like} or salts of these (lithium salts, sodium salts, potassium salts, ammonium salts, tetraalkylammonium salts, and the like); those unsaturated carboxylic acids partly esterified with a $C_1$-$C_{18}$ aliphatic or alicyclic alcohol, alkylene ($C_2$-$C_4$) glycol, polyalkylene ($C_2$-$C_4$) glycol, or the like (methyl maleate, monohydroxyethyl maleate, and the like) or partly amidated with ammonia or a primary or secondary amine (maleic acid monoamide, N-methylmaleic acid monoamide, N,N-diethylmaleic acid monoamide, and the like); (meth) acrylic esters [esters of (meth) acrylic acid with a $C_1$-$C_{18}$ aliphatic (e.g., methyl, ethyl, propyl, butyl, 2-ethylhexyl, or stearyl) alcohol; and esters of (meth)acrylic acid with an alkylene ($C_2$-$C_4$) glycol (ethylene glycol, propylene glycol, 1,4-butanediol, or the like) or with a polyalkylene ($C_2$-$C_4$) glycol (polyethylene glycol or polypropylene glycol)]; (meth)acrylamide or N-substituted (meth)acrylamides [(meth)acrylamide, N-methyl(meth) acrylamide, N-methylol(meth)acrylamide, and the like]; vinyl esters or allyl esters [vinyl acetate, allyl acetate, and the like]; vinyl ethers or allyl ethers [butyl vinyl ether, dodecyl allyl ether, and the like]; unsaturated nitrile compounds [(meth)acrylonitrile, crotononitrile, and the like]; unsaturated alcohols [(meth)allyl alcohol and the like]; unsaturated amines [(meth)allylamine, dimethylaminoethyl (meth)acrylate, diethylaminoethyl(meth)acrylate, and the like]; heterocycle-containing monomers [N-vinylpyrrolidone, vinylpyridine, and the like]; olefinic aliphatic hydrocarbons [ethylene, propylene, butylene, isobutylene, pentene, ($C_6$-$C_{50}$) α-olefins, and the like]; olefinic alicyclic hydrocarbons [cyclopentene, cyclohexene, cycloheptene, norbornene, and the like]; olefinic aromatic hydrocarbons [styrene, α-methylstyrene, stilbene, and the like]; unsaturated imides [maleimide and the like]; and halogen-containing monomers [vinyl chloride, vinylidene chloride, vinylidene fluoride, hexafluoropropylene, and the like].

Examples of the epoxy monomer include glycidyl ethers {bisphenol A diglycidyl ether, bisphenol F diglycidyl ether, brominated bisphenol A diglycidyl ether, phenol-novolac glycidyl ether, cresol-novolac glycidyl ether, and the like}, glycidyl esters {hexahydrophthalic acid glycidyl ester, dimer acid glycidyl esters, and the like}, glycidylamines {triglycidyl isocyanurate, tetraglycidyldiaminophenylmethane, and the like}, linear aliphatic epoxides {epoxidized polybutadiene, epoxidized soybean oil, and the like}, and alicyclic epoxides {3,4-epoxy-6-methylcyclohexylmethylcarboxylate, 3,4-epoxycyclohexylmethylcarboxylate, and the like}. These epoxy resins can be used alone or after having been cured by addition of a hardener thereto. Examples of the hardener include aliphatic polyamines {diethylenetriamine, triethylenetetramine, 3,9-(3-aminopropyl)-2,4,8,10-tetraoxaspiro[5,5]undecane, and the like}, aromatic polyamines {m-xylenediamine, diaminophenylmethane, and the like}, polyamides {dimer acid polyamides and the like}, acid anhydrides {phthalic anhydride, tetrahydromethylphthalic anhydride, hexahydrophthalic anhydride, trimellitic anhydride, and methylnadic anhydride}, phenol compounds {phenolic novolacs and the like}, polymercaptans {polysulfides and the like}, tertiary amines {tris(dimethylaminomethyl)phenol, 2-ethyl-4-methylimidazole, and the like}, and Lewis acid complexes {boron trifluoride/ethylamine complex and the like}.

Examples of the monomer having isocyanate groups include toluene diisocyanate, diphenylmethane diisocyanate, 1,6-hexamethylene diisocyanate, 2,4,4-trimethylhexamethylene diisocyanate, p-phenylene diisocyanate, 4,4'-dicyclohexylmethane diisocyanate, 3,3'-dimethyldiphenyl 4,4'-diisocyanate, dianisidine diisocyanate, m-xylene diisocyanate, trimethylxylene diisocyanate, isophorone diisocyanate, 1,5-naphthalene diisocyanate, trans-1,4-cyclohexyl diisocyanate, and lysine diisocyanate.

In crosslinking the monomer having isocyanate groups, a compound having active hydrogen may also be used. Examples of this compound include polyols and polyamines [difunctional compounds {water, ethylene glycol, propylene glycol, diethylene glycol, dipropylene glycol, and the like}, trifunctional compounds {glycerol, trimethylolpropane, 1,2, 6-hexanetriol, triethanolamine, and the like}, tetrafunctional compounds {pentaerythritol, ethylenediamine, tolylenediamine, diphenylmethanediamine, tetramethylolcyclohexane, methylglucosides, and the like}, pentafunctional compounds {2,2,6,6-tetrakis(hydroxymethyl)cyclohexanol, diethylentriamine, and the like}, hexafunctional compounds {sorbitol, mannitol, dulcitol, and the like}, and octafunctional compounds {sucrose and the like}], polyether polyols {propylene oxide and/or ethylene oxide adducts of the polyols or polyamines mentioned above}, and polyester polyols [condensates of the aforementioned polyols with a polybasic acid {adipic acid, o-, m-, or p-phthalic acid, succinic acid, azelaic acid, sebacic acid, or ricinoleic acid}, polycaprolactone polyols {poly-ϵ-caprolactone and the like}, polycondensates of hydroxycarboxylic acids, and the like].

A catalyst may also be used in conducting the crosslinking reaction. Examples of the catalyst include organotin compounds, trialkylphosphines, amines [monoamines {N,N-dimethylcyclohexylamine, triethylamine, and the like}, cyclic monoamines {pyridine, N-methylmorpholine, and the like}, diamines {N,N,N',N'-tetramethylethylenediamine, N,N,N',N'-tetramethyl-1,3-butanediamine, and the like}, triamines {N,N,N',N'-pentamethyldiethylenetriamine and the like}, hexamines {N,N,N',N'-tetra(3-dimethylaminopropyl) methanediamine and the like}, cyclic polyamines {diazabicyclooctane (DABCO), N,N'-dimethylpiperazine, 1,2-dimethylimidazole, 1,8-diazabicyclo(5,4,0)undecene-7 (DBU), and the like}, and salts of these.

In the step of battery fabrication, methods or procedures for applying the nonaqueous electrolyte of the invention are not limited. Use may be made of a method in which a power-generating element comprising a positive electrode, a negative electrode, and a separator is assembled first and then immersed in and impregnated with the liquid nonaqueous electrolyte, which is caused to gel after the impregnation in some cases. Alternatively, a power-generating element may be assembled after the nonaqueous electrolyte is infiltrated into a positive electrode or negative electrode (and caused to gel after the infiltration in some cases). With respect to methods for immersion, the power-generating element may be immersed at ordinary pressure. However, the vacuum immersion method or the pressure immersion method can also be used. Furthermore, a positive electrode or negative electrode may be formed by kneading materials for the nonaqueous electrolyte together with an electrode material and applying the resultant mixture. This method can be used, for example, in the case where the nonaqueous electrolyte is, in particular, a polymeric solid electrolyte.

The sheath preferably is constituted of a thin material from the standpoint of reducing the weight of the nonaqueous-electrolyte battery. For example, a metal/resin composite material having a constitution comprising resin films and a metal foil sandwiched therebetween is preferred. Examples of the metal foil are not particularly limited as long as they are foils of aluminum, iron, nickel, copper, stainless steel, titanium, gold, silver, or the like which are free from pinholes. However, aluminum foils are preferred because they are lightweight and inexpensive. Preferred for use as the resin film to be disposed on the outer side in the battery is a resin film having excellent piercing strength, such as a poly(ethylene terephthalate) film or nylon film. Preferred as the resin film to be disposed on the inner side in the battery is a film which is fusion-bondable and has solvent resistance, such as a polyethylene film or nylon film.

BRIEF DESCRIPTION OF THE DRAWINGS

Numeral 1 denotes a positive electrode, 11 a positive composite, 12 a positive-electrode current collector, 2 a negative electrode, 21 a negative composite, 22 a negative-electrode current collector, 3 a separator, 4 a power-generating element, and 5 a metal/resin composite film.

BEST MODE FOR CARRYING OUT THE INVENTION

The invention will be explained below in more detail by reference to Examples, but the invention should not be construed as being limited to these statements.

Example 1

One mole of $LiPF_6$ was dissolved in 1 L of a mixed solvent prepared by mixing ethylene carbonate, propylene carbonate, and diethyl carbonate in a ratio of 6:2:2 by volume. Furthermore, tetraethylammonium tetrafluoroborate ($(C_2H_5)_4NBF_4$) was mixed therewith in an amount of 0.06 mol/L. Thus, a nonaqueous electrolyte was obtained.

Example 2

One mole of $LiPF_6$ was dissolved in 1 L of a mixed solvent prepared by mixing ethylene carbonate, propylene carbonate, and diethyl carbonate in a ratio of 6:2:2 by volume. Furthermore, trimethyl-n-butylammoniumu bis(trifluoromethylsulfonyl)imide(($CH_3$)$_3$(n-$C_4H_9$)N($CF_3SO_2$)$_2$N) was mixed therewith in an amount of 0.1 mol/L. Thus, a nonaqueous electrolyte was obtained.

Example 3

One mole of $LiPF_6$ was dissolved in 1 L of a mixed solvent prepared by mixing ethylene carbonate, propylene carbonate, and diethyl carbonate in a ratio of 6:2:2 by volume. Furthermore, 1-ethyl-3-methylimidazolium bis(perfluoroethylsulfonyl)imide was mixed therewith in an amount of 0.3 mol/L. Thus, a nonaqueous electrolyte was obtained.

Example 4

One mole of $LiPF_6$ was dissolved in 1 L of a mixed solvent prepared by mixing ethylene carbonate, propylene carbonate, and diethyl carbonate in a ratio of 6:2:2 by volume. Furthermore, 1-butylpyridinium hexafluorophosphate was mixed therewith in an amount of 0.5 mol/L. Thus, a nonaqueous electrolyte was obtained.

COMPARATIVE EXAMPLE 1

One mole of $LiPF_6$ was dissolved in 1 L of a mixed solvent prepared by mixing ethylene carbonate, propylene carbonate, and diethyl carbonate in a ratio of 6:2:2 by volume. Furthermore, ($C_2H_5$)$_4NBF_4$ was mixed therewith in an amount of 0.7 mol/L. Thus, a nonaqueous electrolyte was obtained.

COMPARATIVE EXAMPLE 2

One mole of $LiPF_6$ was dissolved in 1 L of a mixed solvent prepared by mixing ethylene carbonate, propylene carbonate, and diethyl carbonate in a ratio of 6:2:2 by volume. Thus, a nonaqueous electrolyte was obtained.

(Batteries of the Invention and Comparative Batteries)

The nonaqueous electrolytes of Examples 1 to 4 and Comparative Examples 1 and 2 given above were used to produce lithium batteries as nonaqueous-electrolyte batteries.

Figure 1:
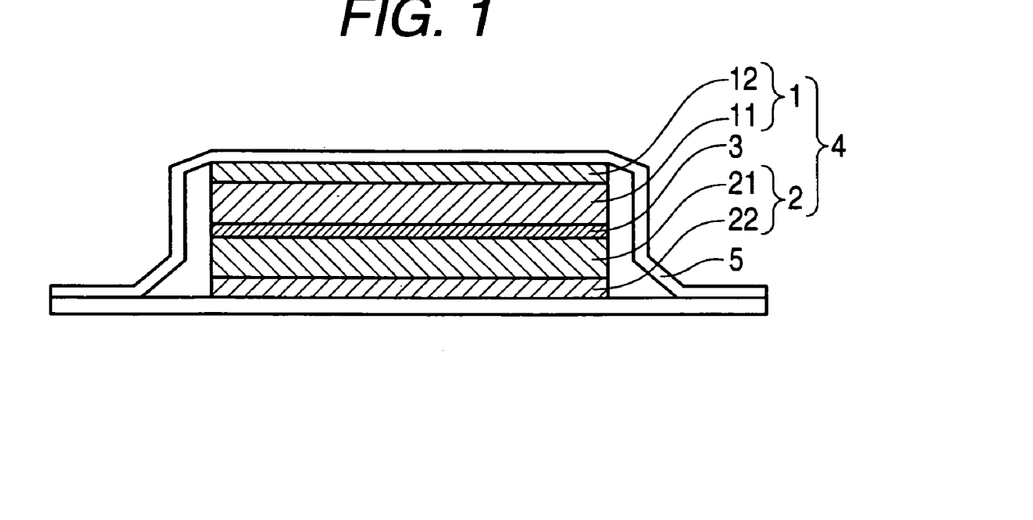
FIG. 1 is a sectional view of a nonaqueous-electrolyte battery according to Examples of the invention.

The lithium batteries according to the Examples are constituted of: a power-generating element 4 comprising a positive electrode 1, a negative electrode 2, and a separator 3; a nonaqueous electrolyte; and a metal/resin composite film 5 as a sheath. The positive electrode 1 comprises a positive-electrode current collector 12 and a positive composite 11 applied thereon. The negative electrode 2 comprises a negative-electrode current collector 22 and a negative composite 21 applied thereon. The nonaqueous electrolyte has been infiltrated into the power-generating element 4. The metal/resin composite film 5 has been disposed so as to cover the power-generating element 4, with the four sides thereof sealed by thermal fusion bonding. A sectional view of the lithium batteries according to the Examples is shown in FIG. 1. The process used for producing the batteries of the constitution described above is explained below.

The positive electrode 1 was obtained in the following manner. First, $LiCoO_2$ as a positive active material was mixed with acetylene black as a conductive material. Furthermore, an N-methyl-2-pyrrolidone solution of poly(vinylidene fluoride) as a binder was mixed therewith. This mixture was applied to one side of a positive-electrode current collector 12 comprising an aluminum foil and then dried. The foil coated was pressed so that the resultant positive composite 11 came to have a thickness of 0.1 mm. The positive electrode 1 was obtained through these steps.

The negative electrode 2 was obtained in the following manner. First, a graphite as a negative-electrode material was mixed with an N-methyl-2-pyrrolidone solution of poly(vinylidene fluoride) as a binder. This mixture was applied to one side of a negative-electrode current collector 22 comprising a copper foil and then dried. The foil coated was pressed so that the resultant negative composite 21 came to have a thickness of 0.1 mm. The negative electrode 2 was obtained through these steps.

As the separator 3 was used a microporous film made of polyethylene (thickness, 25 μm; porosity, 50%).

The power-generating element 4 was produced by superposing the positive electrode 1, the separator 3, and the negative electrode 2 in this order so that the positive composite 11 and the negative composite 21 faced each other, with the separator 3 interposed between these.

Subsequently, the power-generating element 4 was immersed in the nonaqueous electrolyte to thereby infiltrate the nonaqueous electrolyte into the power-generating element 4. Furthermore, the power-generating element 4 was covered with a metal/resin composite film 5 and the four sides thereof were sealed by thermal fusion bonding to thereby constitute a sheath.

The nonaqueous electrolytes of Examples 1 to 4 and Comparative Examples 1 and 2 were used to produce invention batteries 1 to 4 according to the invention and comparative batteries 1 and 2, respectively. The design capacity of each of these lithium batteries according to these Examples is 10 mAh.

(Initial Charge/Discharge Test)

Subsequently, invention batteries 1 to 4 and comparative batteries 1 and 2 described above were examined for first-charge capacity and first-discharge capacity. As first charge was conducted constant-current constant-voltage charge at 20° C. under the conditions of a current of 2 mA and a final voltage of 4.2 V. The charge capacity thus obtained was taken as the first-charge capacity. Subsequently to the first charge, constant-current discharge was conducted as first discharge at 20° C. under the conditions of a current of 2 mA and a final voltage of 2.7 V. The discharge capacity thus obtained was taken as the first-discharge capacity. With respect to each battery, the proportion of the first-discharge capacity to the first-charge capacity was determined in terms of percentage, and this value was taken as the initial efficiency.

(High-Rate Discharge Test)

Subsequently, invention batteries 1 to 4 and comparative batteries 1 and 2 were subjected to a high-rate discharge test.

The test temperature was 20° C. As charge was conducted constant-current constant-voltage charge under the conditions of a current of 2 mA and a final voltage of 4.2 V. As discharge was conducted constant-current discharge under the conditions of a current of 5 mA and a final voltage of 2.7 V. The battery capacity thus obtained was taken as the high-rate discharge capacity.

Figure 2:
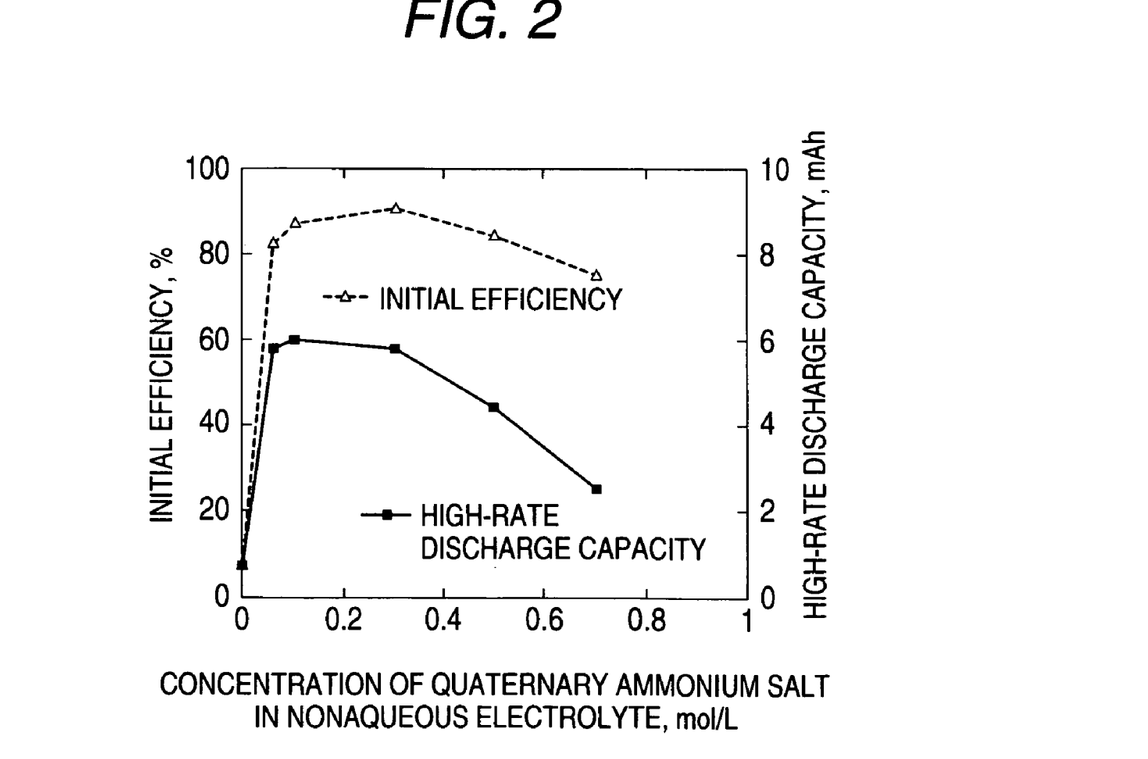
FIG. 2 is a presentation showing performances of batteries of the invention and comparative batteries.

The results obtained are shown in Table 1 and FIG. 2.

TABLE 1

| | Concentration of quarternary ammonium salt mol/L | First-charge capacity mAh | First-discharge capacity mAh | Initial Efficiency % | High-rate discharge capacity mAh |
|---|---|---|---|---|---|
| Invention battery 1 | 0.06 | 11.5 | 9.5 | 82.6 | 5.8 |

TABLE 1-continued

|  | Concentration of quarternary ammonium salt mol/L | First-charge capacity mAh | First-discharge capacity mAh | Initial Efficiency % | High-rate discharge capacity mAh |
|---|---|---|---|---|---|
| Invention battery 2 | 0.1 | 11.2 | 9.8 | 87.5 | 6.0 |
| Invention battery 3 | 0.3 | 10.9 | 9.9 | 90.8 | 5.8 |
| Invention battery 4 | 0.5 | 11.0 | 9.3 | 84.5 | 4.4 |
| Comparative battery 1 | 0.7 | 11.3 | 8.5 | 75.2 | 2.5 |
| Comparative battery 2 | 0 | 21.1 | 1.7 | 7.9 | 0.8 |

As apparent from Table 1 and FIG. 2, comparative battery 2, which contained no quaternary ammonium salt, had an exceedingly large first-charge capacity, which was about 2 times the design capacity, and had an exceedingly small first-discharge capacity. Namely, this comparative battery had an exceedingly low initial efficiency. The reason for these results is thought to be that the propylene carbonate in the nonaqueous electrolyte underwent decomposition on the graphite negative electrode during first charge and this resulted in a reduced reversible capacity.

In contrast, invention batteries 1 to 4, in which a quaternary ammonium salt had been added in an amount of 0.06-0.5 mol/L, were excellent in both first-charge capacity and first-discharge capacity and showed a markedly improved initial efficiency. In addition, these batteries showed markedly improved high-rate discharge characteristics. The reasons for these results are thought to be as follows. During first charge, the quaternary ammonium salt decomposed on the graphite negative electrode to form, on the surface of the graphite negative electrode, a lithium ion-permeable protective coating film which was dense and had excellent permeability to lithium ions. This protective coating film surely inhibited the organic solvent used in the nonaqueous electrolyte from decomposing.

On the other hand, comparative battery 1, in which a quaternary ammonium salt had been added in an amount of 0.7 mol/L, was relatively satisfactory in first-charge capacity and first-discharge capacity. However, this battery had a considerably small high-rate discharge capacity, which was about 30% of the first-discharge capacity. Although the reason for this has not been fully elucidated, it is thought that the small high-rate discharge capacity is attributable to an increase in the viscosity of the nonaqueous electrolyte or an increase in the resistance of the protective coating film.

In the Examples given above, nonaqueous electrolytes containing ethylene carbonate and propylene carbonate were used. However, nonaqueous electrolytes containing butylene carbonate, γ-butyrolactone, and γ-valerolactone were ascertained to likewise bring about the effects of the invention.

Especially in nonaqueous electrolytes containing either of propylene carbonate and butylene carbonate, the effects of the invention were particularly markedly observed as in the Examples given above, in contrast to the corresponding system which contained no quaternary ammonium salt.

Incidentally, as FIG. 2 suggests, the influences of the content of a quaternary ammonium salt on initial efficiency and high-rate discharge characteristics were likewise observed regardless of the kind of the quaternary ammonium salt.

INDUSTRIAL APPLICABILITY

As described above, a nonaqueous-electrolyte battery which is highly safe and has a high charge/discharge efficiency and a high energy density can be easily provided according to the invention. The invention hence has a high industrial value.

The invention claimed is:

1. A nonaqueous electrolyte, comprising:
   an organic solvent and a lithium salt dissolved in the organic solvent; and
   a quaternary ammonium salt in an amount of 0.06 mol/L or greater and 0.5 mol/L or less, the quaternary ammonium salt having a structure represented by (chemical formula 2):

(chemical formula 2)

(wherein R is a divalent organic linking group having a main chain which has 4-5 atoms and is constituted of at least one member selected from carbon, oxygen, nitrogen, sulfur, and phosphorus; R1 and R2 each are either an alkyl group having 1-6 carbon atoms or an alkyl group in which at least one of the hydrogen atoms has been replaced by a fluorine atom; and X⁻ is a fluorine-containing anion).

2. The nonaqueous electrolyte of claim 1, wherein said organic solvent comprises one or more organic solvents selected from the group consisting of ethylene carbonate, propylene carbonate, butylene carbonate, γ-butyrolactone, and γ-valerolactone.

3. The nonaqueous electrolyte of claim 1, wherein the nonaqueous electrolyte comprises one or more members selected from the group consisting of $BF_4^-$, $PF_6^-$; $CF_3SO_3^-$, $N(CF_3SO_2)_2^-$, $N(C_2F_5SO_2)_2^-$, $N(CF_3SO_2)(C_4F_9SO_2)^-$, $C(CF_3SO_2)_3^-$, and $C(C_2F_5SO_2)_3^-$.

4. A nonaqueous-electrolyte battery, comprising: a positive electrode, a negative electrode, and a nonaqueous electrolyte according to claim 1.

5. The nonaqueous-electrolyte battery of claim 4, wherein the negative electrode comprises a graphite.

6. The nonaqueous-electrolyte battery of claim 4, further comprising:
   a sheath formed over said positive and negative electrodes and said electrolyte, said sheath comprising a metal/resin composite material.

7. A nonaqueous-electrolyte battery which comprises a positive electrode, a negative electrode, and a nonaqueous electrolyte according to claim 2.

8. A nonaqueous-electrolyte battery which comprises a positive electrode, a negative electrode, and a nonaqueous electrolyte according to claim 3.

9. The nonaqueous electrolyte of claim 1, wherein said organic solvent comprises a member selected from the group consisting of propylene carbonate and butylene carbonate.

10. The nonaqueous electrolyte of claim 1, wherein the quaternary ammonium salt having a structure represented by chemical formula 2 comprises a combination of an anion and a member selected from the group consisting of a pyrrolidinium cation, piperidinium cation, and pyrrolium cation.

11. The nonaqueous electrolyte of claim 10, wherein the pyrrolidinium cation comprises a member selected from the group consisting of a 1,1-dimethylpyrrolidinium ion, 1-ethyl-1-methyl-pyrrolidinium ion, 1-methyl-1-propylpyrrolidinium ion, and 1-butyl-1-methylpyrrolidinium ion,
wherein the piperidinium cation comprises a member selected from the group consisting of a 1,1-dimethylpiperidinium ion, 1-ethyl-1-methylpiperidinium ion, 1-methyl-1-propylpiperidinium ion, and 1-butyl-1-methylpiperidinium ion, and
wherein the pyrrolium cation comprises a member selected from the group consisting of a 1,1-dimethylpyrrolium ion, 1-ethyl-1-methylpyrrolium ion, 1-methyl-1-propylpyrrolium ion, and 1-butyl-1-methylpyrrolium ion.

12. The nonaqueous electrolyte of claim 1, wherein said amount of said quaternary ammonium salt is 0.1 mol/L or greater and 0.35 mol/L or less.

13. The nonaqueous electrolyte of claim 1, wherein said lithium salt comprises a member selected from the group consisting of $LiBF_4$, $LiPF_6$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$.

14. A nonaqueous-electrolyte battery, comprising:
a power generating unit comprising a positive electrode, a negative electrode, and a separator interposed between said positive and negative electrodes; and
a nonaqueous electrolyte impregnated into said power generating unit, said nonaqueous electrolyte comprising:
an organic solvent and a lithium salt dissolved in the organic solvent; and
a quaternary ammonium salt in an amount of 0.06 mol/L or greater and 0.5 mol/L or less, the quaternary ammonium salt having a structure represented by (chemical formula 2):

(chemical formula 2)

(wherein R is a divalent organic linking group having a main chain which has 4-5 atoms and is constituted of at least one member selected from carbon, oxygen, nitrogen, sulfur, and phosphorus; R1 and R2 each are either an alkyl group having 1-6 carbon atoms or an alkyl group in which at least one of the hydrogen atoms has been replaced by a fluorine atom; and $X^-$ is a fluorine-containing anion).

* * * * *